Patented July 23, 1929.

1,721,931

UNITED STATES PATENT OFFICE.

CHARLES M. STINE, OF WILMINGTON, DELAWARE, ASSIGNOR TO E. I. DU PONT DE NEMOURS & COMPANY, OF WILMINGTON, DELAWARE, A CORPORATION OF DELAWARE.

COATING COMPOSITION AND PROCESS OF MAKING SAME.

No Drawing. Application filed July 25, 1925. Serial No. 46,164.

This invention relates in general to coating compositions, or paint and varnish liquids, containing rubber in solution in deaggregated form. More specifically it relates to the incorporation into such a solution of certain substances which are adapted to effect the cure of the rubber and to the compositions resulting from such incorporation. To this mixture oil and a metal drier may be added. Such compositions when air dried or heated in the form of thin films will yield a protective coating which is hard, durable and flexible, and which has desirable properties not possessed by compositions containing ordinary rubber.

Improvements which consist essentially in the use of deaggregated rubber, either wholly or in part, in place of ordinary rubber, have already been described. Also the use of a metal drier to effect the deaggregation of the rubber, the drying of the oil (when employed), and the curing of the rubber has been disclosed.

It has now been discovered, however, that it is possible to employ curing agents generally in connection with deaggregated rubber solutions. For example, substances such as organic nitro compounds and vulcanizing agents may be employed as well as the metallic driers. Moreover, where a drying oil and a drier for the oil are incorporated in the rubber solution, it has been found advantageous to also employ an additional and non-drying curing agent especially for the rubber.

Before proceeding further, in order to avoid possible misunderstanding I will define certain terms in the sense in which they are employed throughout this specification.

By the term "deaggregated" or "depolymerized" rubber, I mean any variety or type of rubber which has undergone while in solution and independently of the proportions of rubber and solvent a loss in viscosity or body to any extent ranging from an appreciable loss in viscosity to a loss to the point of minimum viscosity; this loss in viscosity being due presumably to greater dispersion of the rubber particles. The preparation of such rubber will be explained in detail hereinafter.

In the use of the term "rubber," I do not wish to limit myself to crude or unvulcanized rubber, although the use of this variety is to be preferred in the practice of my invention. In the interpretation of my claims, the term "rubber" is meant to include crude or unvulcanized caoutchouc, under which head may be included all the botanical varieties such as hevea, balata, gutta percha, etc., and as well includes vulcanized rubber of any botanical variety in the state of partial to complete vulcanization, as well as reclaimed rubber.

The term "oil" whenever used covers animal, vegetable or mineral oil, including all types of drying, semi-drying and non-drying oils and, as well, specially treated oils such as blown or ozonized oils.

By the term "drier" is meant a salt or an oxide of a metal such as cobalt, lead, manganese, zinc, etc., which functions probably as a carrier of oxygen, thereby catalyzing the oxidation of oil, as well as the curing of the rubber; bringing about through such reaction, in solution, usually a loss in viscosity due to the deaggregation of the rubber. Finely divided metals will also sometimes function as driers (see Morrell, Varnishes and Their Compositions, London, 1923).

The terms "thinner" and "pigment" when used will have the meaning commonly assigned them in ordinary paint and varnish practice.

By the term "curing agent", unless otherwise modified, I intend to designate any substance which effects the cure of the rubber, whether a drier, as defined above, or a non-drying curing agent as dinitrobenzene, or a vulcanizing agent as sulfur. Certain pigments as Prussian blue, white lead and aluminum hydrate also perform to a greater or less extent the function of curing.

As has been stated already, compositions containing deaggregated rubber have many desirable properties not possessed by compositions containing ordinary (aggregated) rubber, some of which advantages I will proceed to relate.

Perhaps the most striking feature of deaggregated rubber solutions is their low viscosity as compared with the viscosity of ordinary rubber solutions. As an example, I have found that a 10% solution of ordinary rubber in benzine containing rubber previously subjected to ordinary plasticization may have a viscosity as high as 2500 when measured with a Scott orifice viscosimeter (described in "White Paints and Painting Materials" by W. T. Scott, pages 440–441), as compared with 10% solutions of deaggregated rubber in benzine, having viscosities of 35 or less when measured in the same manner. This enormous difference in body or viscosity between the two types of rubber solutions can be utilized to advantage in many ways in the preparation of coating compositions. For instance, due to the nature of deaggregated rubber solutions and, more particularly, the low viscosity of such solutions, it is possible to successfully spray products containing deaggregated rubber as contrasted to products containing normal rubber, which do not spray satisfactorily. And again, deaggregated rubber solutions of comparatively high rubber content (although the viscosity is comparatively low) may be prepared, which fact permits the application of films of substantially greater thickness. Obviously, this will result in greater durability, waterproofness and a reduction in the number of coats required.

Another advantage will appear from a consideration of the fact that metallic driers, as well as certain pigments, presumably cause a loss in viscosity of ordinary rubber solutions which is serious, inasmuch as such products lose some of their valuable properties. However, where deaggregated rubber solutions are used there can be, in general, substantially no further loss in viscosity. This is obviously a very important and desirable condition, inasmuch as products containing deaggregated rubber will be more stable, chemically and physically.

And again, in a preceding application agents for the prevention of "lobbering" of rubber varnishes and enamels caused by the action of certain pigments on the rubber in such products were described. It has been found that solutions of deaggregated rubber apparently do not "lobber" when brought into contact with pigments normally causing "lobbering" with aggregated or normal rubber. The use of deaggregated rubber, therefore, permits the incorporation of practically any pigment without the subsequent danger of the resulting product "lobbering", and, accordingly, substantially increases the scope and stability of such products.

Various methods for deaggregating rubber may be employed and the following are given as examples, only:

(1) Rubber which has been suitably plasticized by milling according to prior art may be dissolved in benzol, turpentine or certain petroleum distillates and drier incorporated therein to give a substantially homogeneous solution which, on aging in the presence of air or on suitable agitation, will become deaggregated. As an example, illustrative of the above procedure, 2 pounds of rubber are plasticized on a rubber mill for a period of 20 minutes and then dissolved in 18 pounds of benzine, with the aid of mechanical agitation. To this solution is added .01 pound of cobalt linoleate dissolved in .04 pound of turpentine and the whole mixture vigorously agitated in contact with the air for approximately 60 hours. The agitation should be such that air is churned into the solution. At the end of this period it will be found that the viscosity of the solution has dropped to a value of about 40 seconds (by the Scott viscosimeter) as compared to the initial viscosity of about 2500 seconds.

(2) Deaggregated rubber may be prepared by dissolving, for example, 2 lbs. of rubber in 8 lbs. of benzine, adding .05 lb. of a 20% turpentine solution of cobalt linoleate, vigorously agitating the resulting mixture in contact with air for 60 hours. The agitation should be such that the air is churned into the liquid. At the end of this period the viscosity will have reached the value of about 35 seconds (Scott viscosimeter) and the solution is suitable for incorporation in the composition.

(3) Likewise, rubber which has been suitably plasticized by milling may be dissolved in turneptine or compounds chemically similar which have been oxidized by the passage of air or oxygen through them, and on proper aging will become deaggregated. The following example will serve to illustrate the above process: Two pounds of rubber previously milled for 20 minutes are dissolved in 18 pounds of oxidized turpentine. The oxidized turpentine is prepared by blowing oxygen through turpentine for 24 hours. The above rubber solution is then vigorously agitated in contact with the air for 120 hours, when it is found that the viscosity has dropped to a figure of about 80 seconds (Scott viscosimeter) as compared to the initial viscosity of about 2700 seconds.

(4) Certain chemical compounds such as acetic acid, or its substitution products formed by chlorination, benzoic and formic acids, etc., also have the power of deaggregating rubber solutions. The example given below illustrates the above procedure: Two pounds of rubber milled for 20 minutes is dissolved in 18 pounds of benzole. To this solution is added .02 pound of trichloracetic acid and the mixture mechanically agitated for about 90 hours when the viscosity will have dropped to a value of about 55 seconds (Scott viscosimeter) as compared to an initial viscosity of about 2400 seconds.

It has been previously disclosed that driers are capable of effecting a cure for rubber and an oxidation of the oil simultaneously, and, moreover, that rubber may be cured by driers alone. However, the cure of compositions containing deaggregated rubber is by no means confined to driers alone.

The present invention is concerned with the fact that it has been found possible to obtain homogeneous solutions consisting of deaggregated rubber by the use of curing agents, generally, for the rubber, non-drying and drying. A suitable thinner for the rubber is, of course, employed. To this mixture may be added oil or pigment or both. Where an oil is used with a non-drying curing agent there will be required, in general, a metal drier for the oil.

While generally speaking it is not of paramount importance whether a drier or a non-drying curing agent is employed in conjunction with the deaggregated rubber solutions, nevertheless, where a special curing agent is employed for the rubber in addition to a drier for the oil, the resulting coating compositions have advantages under certain conditions and for particular purposes over the compositions where the cure is effected by the drier alone. For example, where a thick coat is desirable the use of such curing agents renders it possible to effect the cure of much thicker rubber containing films. Thus, the field of usefulness of the compositions is broadened. Also for certain types of exposure or usage films containing rubber cured with sulfur or dinitrobenzene resist deterioration to a greater extent than such films cured with metal drier only.

Such a solution may be applied to a surface in any way and may be either air dried or, to accelerate the process, heated from ordinary room temperature to temperatures as high as 500° F. to give a hard, elastic film in which the rubber is cured. The time and temperature conditions for curing are susceptible of wide variation.

The following formula in which the proportions are indicated by weight will illustrate a type of varnish liquid containing only a drier as a curing agent.

|   | Parts |
|---|---|
| Deaggregated rubber (as dry rubber) | 108 |
| Bodied Perilla oil | 148 |
| Cobalt linoleate | 2.1 |
| Benzine | 452 |

Pigments may, of course, be incorporated in the above formula to give enamels or color varnishes. Moreover, the oil may be omitted to give a clear rubber varnish which will yield a very durable, protective coating on air drying or heating.

The following formula will illustrate a coating composition of the type containing a curing agent in addition to a drier:

|   | Parts |
|---|---|
| Deaggregated rubber | 108 |
| Bodied Perilla oil | 148 |
| Dinitrobenzene | 32.4 |
| Benzine | 452 |
| Cobalt linoleate | 2.2 |

The proportions are indicated by weight. It is understood, of course, that part of the cobalt linoleate content specified in the above formula, as an example of a drier, may be supplied by the percentage of the same present in the rubber solution necessary for deaggregating the rubber when this method of effecting deaggregation has been employed.

Dinitrobenzene is specified above but it is only one example of organic nitro compounds functioning as curing agents. Other such compounds as trinitrobenzene, dinitrotoluene, tetranitronaphthylamine and nitrocyclohexane may be used instead.

Although the presence of an oil as an ingredient of such compositions, as exemplified above, is not necessary to obtain a film having the properties described, yet in many cases it has been found advantageous to incorporate an oil. Bodied Perilla oil is prepared, preferably, by subjecting refined Perilla oil to a temperature of 575° F. for one hour. During this treatment the viscosity of the oil increases somewhat, and acquires other valuable properties; such as, improved drying time as well as superior film forming characteristics on incorporation with the other ingredients with which it is formed into a substantially homogeneous mixture by agitation.

Films may be prepared from the coating composition above described by any of the well-known methods, as spraying, brushing, or flowing. Such films may be suitably cured to give hard, elastic, and durable coatings by heating, for example, at 250° F. for three hours.

Instead of the organic nitro curing agent employed above, it is possible to use as a curing agent a vulcanizing agent with or without an accelerator. A coating composition containing deaggregated rubber, vulcanizing agent, accelerator, drier for oil (when used) and thinner therefor, will yield a hard, durable, elastic film when applied to a surface and air dried or heated to a suitable temperature.

The following formula illustrates the above-mentioned type of coating composition:

|   | Parts. |
|---|---|
| Deaggregated rubber | 108 |
| Perilla oil | 148 |
| Zinc oxide | 10.8 |
| Sulfur | 21.6 |
| Diphenyl-guanidine (optional) | 10.8 |
| Cobalt linoleate | .65 |
| Benzine | 45.2 |

The sulfur and zinc oxide are incorporated by milling into the rubber. This mixture is then dissolved in thinner along with the oil, drier and diphenyl-guanidine and the whole agitated till a substantially homogeneous solution is obtained. It is understood, of course, that part of the cobalt linoleate content specified in the above formula may be supplied by the percentage of the same present in the rubber solution necessary for deaggregating the rubber, provided that method of effecting deaggregation has been employed.

Films may be prepared from the coating composition above described by any of the well-known methods, as spraying, brushing, or flowing. Such films may be suitably cured to give hard, elastic, and durable coatings by heating, for example, at 250° F. for three hours.

The compound diphenyl-guanidine is to be considered as merely representative of the class of substances known as vulcanization-accelerators, others of which are the thiurams, as tetramethylthiuram disulfide, and amine reaction products. The function of these compounds is merely to hasten the curing and they may be dispensed with if desired.

The vulcanizing agent sulfur, although generally preferred, may be replaced by any equivalent substance, for example, sulfur chloride, bromine and ozone.

To summarize, therefore, this invention comprises the preparation of a coating composition containing rubber in a state of deaggregation together with a curing or vulcanizing agent for the rubber and a thinner. Such a composition when air dried or heated in the form of thin films will yield a protective coating which is harder, more durable, and more flexible than ordinary varnish films and has desirable properties not possessed by compositions containing ordinary (aggregated) rubber. Oils or pigments or both may be incorporated in such compositions without adversely affecting the resulting films. In general, the quantity of oil will not exceed 78 parts to one of rubber, and the drier where employed will be present in quantities between .001% and 10% (figured as metal) of the oil and rubber combined.

I claim:

1. The process of manufacturing a non-aqueous coating composition containing a solution of rubber and a non-drying curing agent for the rubber, said curing agent being adapted to effect a reduction in the viscosity of a solution of ordinary rubber, which process comprises reducing the viscosity of a rubber solution to a substantial minimum for a given concentration by agitation in the presence of air and an agent adapted to promote oxidation and subsequently incorporating the curing agent whereby the viscosity of said composition is not thereafter substantially reduced by the action of the curing agent.

2. In the manufacture of a coating composition containing rubber the step of incorporating a non-drying curing agent in a solution of substantially completely deaggregated rubber.

3. A process for the manufacture of a coating composition which comprises dissolving rubber in a volatile solvent, agitating the solution in the presence of oxygen and an oxidizing catalyst until the viscosity of said solution is no longer substantially reduced, and incorporating therewith a curing agent.

4. A process for the manufacture of a coating composition which comprises dissolving rubber in a volatile solvent, agitating the solution in the presence of oxygen and a drier until the viscosity of said solution is no longer substantially reduced, and incorporating therewith a non-drying curing agent.

5. In the manufacture of a coating composition containing substantially completely deaggregated rubber and a drying oil, the incorporation of a drier for the oil and a non-drying curing agent for the rubber.

6. The process of manufacturing a coating composition containing in combination a solution of rubber and an organic nitro compound adapted to function as a curing agent for the rubber, which process comprises first reducing the viscosity of the rubber solution to a substantial minimum for a given concentration by agitation in the presence of air an agent adapted to promote oxidation and then adding the organic nitro compound, whereby the viscosity of the said composition is not thereafter substantially reduced by the action of the organic nitro compound.

7. A process for the manufacture of a coating composition containing rubber which comprises effecting substantially complete reduction in the viscosity of a rubber solution by agitating said solution in the presence of an oxidizing agent for at least 60 hours, and subsequently incorporating therewith a curing agent for the rubber.

8. A non-aqueous coating composition containing a non-drying curing agent adapted to effect a reduction in the viscosity of a solution of ordinary rubber and, in combination with said curing agent, a solution of rubber in a volatile solvent, the viscosity of which rubber solution has been reduced to a substantial minimum for a given concentration by agitation in the presence of air and an agent adapted to promote oxidation, whereby the viscosity of said composition is substantially unaffected by said curing agent.

9. A non-aqueous coating composition comprising a drying oil, a drier, a non-drying curing agent and a solution of rubber in an organic solvent, said solution containing at least 10% rubber and having a viscosity not over 80 seconds as measured by the Scott viscosimeter.

10. A non-aqueous coating composition comprising a drying oil, a drier, an organic nitro compound and a solution of rubber in an organic solvent, said solution containing at least 10% rubber and having a viscosity not over 80 seconds as measured by the Scott viscosimeter.

11. A coating composition comprising substantially completely deaggregated rubber, drying oil, drier, thinner and a non-drying curing agent for the rubber, in which the ratio of oil to rubber does not exceed 78.

12. A coating composition comprising a non-drying curing agent and a solution of rubber in an organic solvent, said solution containing at least 10% rubber and having a viscosity not over 80 seconds as measured by the Scott viscosimeter.

13. An article of manufacture having a protective coating prepared from a non-aqueous coating composition containing a non-drying curing agent adapted to effect a reduction in the viscosity of a solution of ordinary rubber and, in combination with said curing agent, a solution of rubber in a volatile solvent, the viscosity of which rubber solution has been reduced to a substantial minimum for a given concentration by agitation in the presence of air and an agent adapted to promote oxidation.

In testimony whereof I affix my signature.

CHARLES M. STINE.